Sept. 28, 1937.　　　R. W. WAGNER　　　2,094,420
MOWING MACHINE
Filed May 11, 1936　　　2 Sheets-Sheet 1
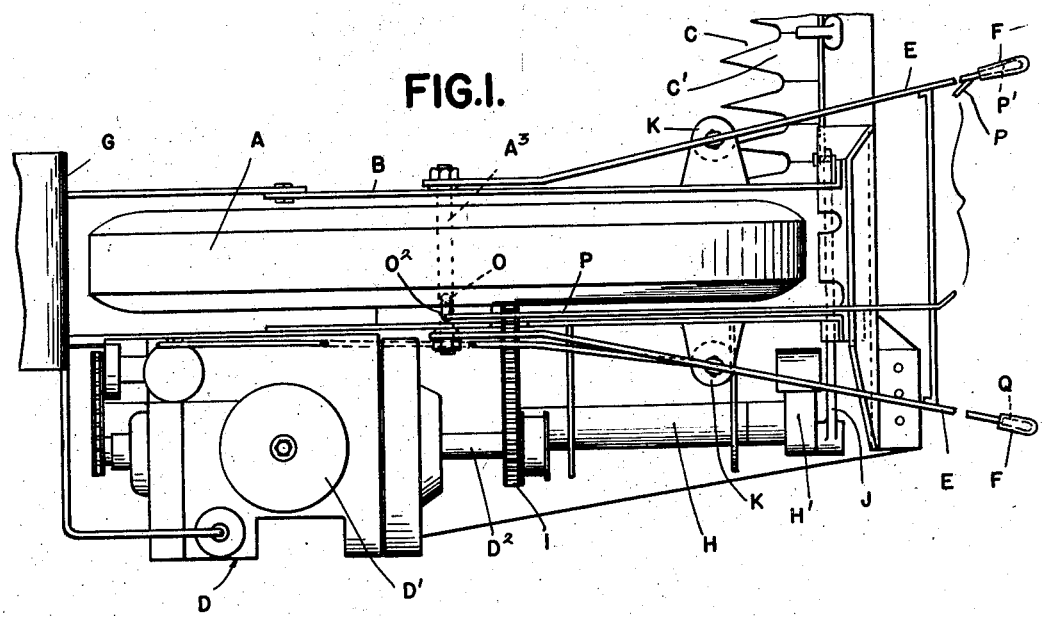
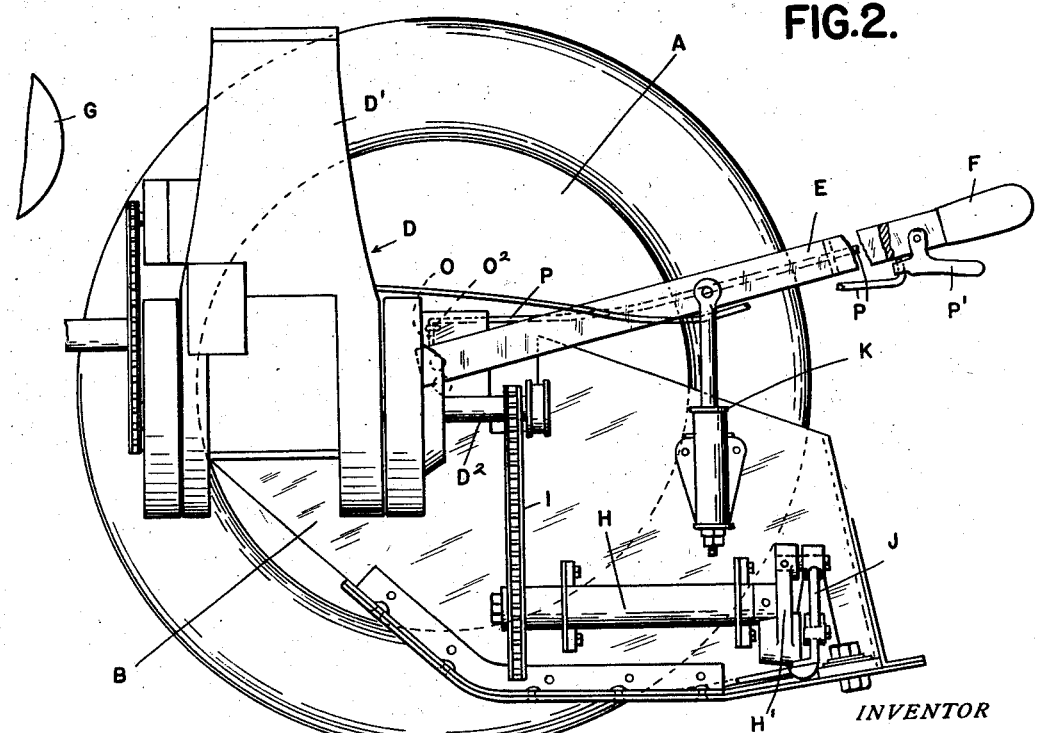
INVENTOR
ROBERT W. WAGNER
ATTORNEYS Sept. 28, 1937.  R. W. WAGNER  2,094,420
MOWING MACHINE
Filed May 11, 1936  2 Sheets-Sheet 2

INVENTOR
ROBERT W. WAGNER
BY Whittemore Hulbert
Whittemore & Belknap
ATTORNEYS

Patented Sept. 28, 1937

2,094,420

UNITED STATES PATENT OFFICE 2,094,420

MOWING MACHINE

Robert W. Wagner, Detroit, Mich., assignor to Detroit Harvester Company, Detroit, Mich., a corporation of Michigan Application May 11, 1936, Serial No. 79,113

3 Claims. (Cl. 56—25)

The invention relates to mowing machines of that type in which power driven operating mechanism is supported on a single ground wheel which is guided and propelled by the operator through the medium of handle bars. It is the object of the present invention to lessen the labor of operation by providing power driven means for propelling the ground wheel, in addition to the means for actuating the mowing mechanism. To this end, the invention consists in the construction as hereinafter set forth.

In the drawings:

Figure 1 is a plan view of the machine;

Figure 2 is a side elevation thereof;

Figure 5:
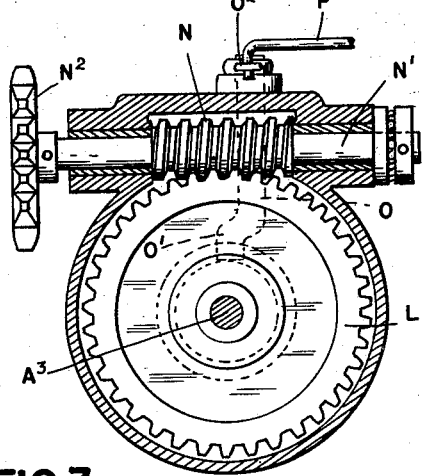
Figure 5 is a section on line 5—5 of Figure 4.
Figure 4:
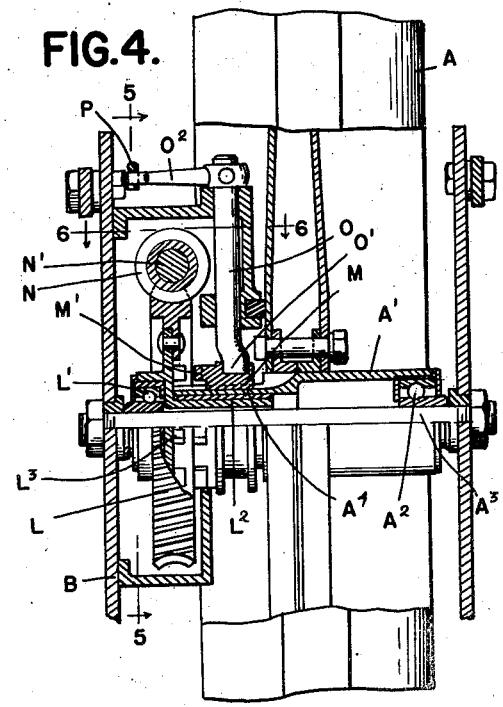
Figure 4 is a horizontal section illustrating the clutch mechanism.
Figure 3:
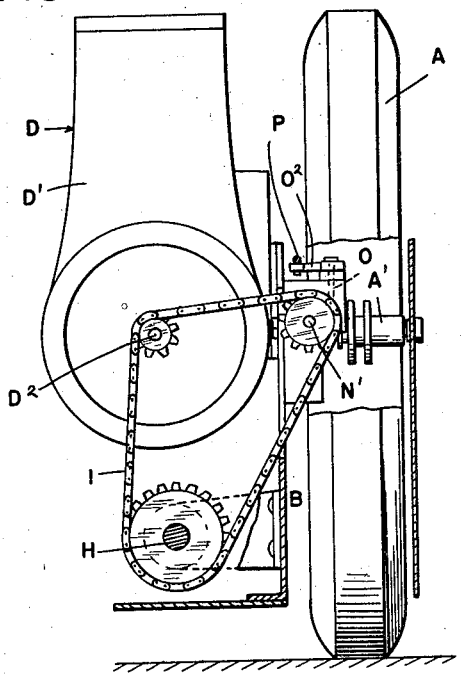
Figure 3 is a transverse section.
Figure 6:
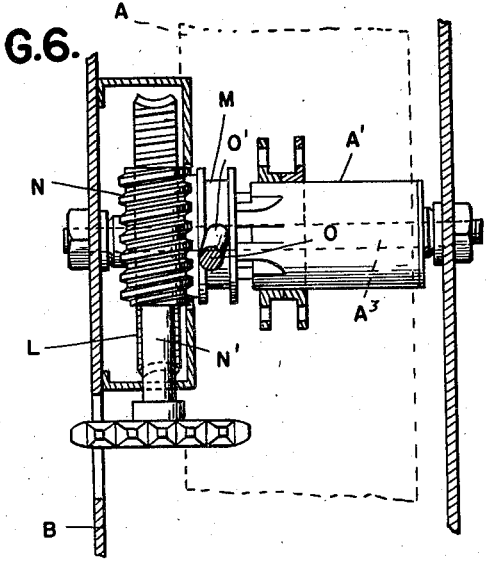
Figure 6 is a section on line 6—6 of Figure 4.

In general construction, my improved machine is similar to mowing machines that have heretofore been used comprising a ground wheel A on which is supported a frame B carrying on one side of said ground wheel the mowing mechanism C and on the opposite side the power plant D. This frame is further provided with handle bars E which extend rearward therefrom having at their rear ends the handles F. The construction is so designed that the parts of the mechanism on opposite sides of the wheel and on opposite sides of the axis thereof are substantially in balance, so that the operator is only required to hold the frame in upright position and to guide it as desired.

The power plant preferably comprises an internal combustion engine D' which is fed with fuel from a supply tank G and which is connected with the mowing mechanism through a suitable intermediate transmission. This comprises a rotary shaft H driven from the engine shaft $D^2$ through a chain and sprocket connection I. The shaft H has a crank H' at the end thereof connected by the rod J with the reciprocatory sickle bar C' of the mowing mechanism, which together with the stationary bar extends laterally from the frame on the opposite side thereof from the engine and shaft H. There is also preferably a shock absorber K for connecting the frame B with the handle bars to lessen the shocks and vibrations communicated thereto.

As has been stated, it is the object of the present invention to provide power means for propelling the ground wheel which, however, is under the control of the operator so as to permit him to start or stop advancement and to direct the machine as desired. This mechanism is preferably of the following construction:

The hub A' of the ground wheel is preferably mounted on ball bearings $A^2$ on a stationary shaft $A^3$ connecting the opposite sides of the frame. Mounted on this same shaft $A^3$ is a worm gear wheel L which is independently rotatable on a ball bearing L' and has a portion $L^2$ telescopically engaging a portion $A^4$ of the hub A'. This hub portion is splined and has sleeved thereon a collar M provided with clutch teeth M' for engagement with cooperating clutch teeth $L^3$ on the worm wheel L. The worm wheel L is driven by a worm N on a shaft N' which has a sprocket $N^2$ engaged by the chain I which drives the shaft H. Thus, when the engine is running, motion is communicated to both the shaft H with the sickle bar connected thereto and to the worm N which drives the worm gear L. Also, when the teeth M' of the collar M are in engagement with the teeth $L^3$ movement will be imparted to the ground wheel A. To control the clutching and declutching I have provided a rockshaft O having a crank O' at one end thereof engaging a groove in the collar M. The opposite end of this shaft has a rock arm $O^2$ which is connected to a rod P extending rearward adjacent to one of the handle bars and connected at its rear end to a rockable lever P' adjacent to the handle F. The operator may thus manipulate the lever P', while still grasping the handle F and in this manner he is enabled to clutch or declutch the driving connection to the ground wheel. The sickle bar is constantly operated when the engine is running, but to regulate its speed, there is provided a throttle control actuated by a lever Q adjacent to the handle F on the other handle bar.

With the construction as described, the ratio of the gearing is such that for ordinary operation the advancement of the machine is suitable for operation of the mowing mechanism. If, however, the operator desires to retard the advancement or to hold the machine stationary, he can do so by declutching the drive for the ground wheel. This gives him the same control of the machine as where advancement is manual but lessens the labor of the operation.

While I have described my machine as of the type having a single ground wheel, it is obvious that the spirit of my invention does not preclude the use of auxiliary wheels.

What I claim as my invention is:

1. A mowing machine having a frame, a stationary shaft carried by said frame, a ground wheel having a hub rotatably mounted on said shaft, a worm gear rotatably mounted on said shaft and telescopically engaging the hub of the ground wheel, said worm gear having clutch teeth, a collar splined on said wheel hub and provided with clutch teeth for engagement with the clutch teeth on said worm gear, a worm for rotating said gear, a power plant carried by said frame, a mowing implement carried by said frame, a constant driving connection between said power plant, mowing implement and worm, and means operable while the mowing implement is operating for shifting the clutch teeth on the collar into engagement with the clutch teeth on the gear to cause the ground wheel to be driven from the power plant.

2. A mowing machine having a frame, a stationary shaft carried by said frame, a ground wheel having a hub rotatably mounted on said shaft, a worm gear rotatably mounted on said shaft and having clutch teeth, a collar splined on said wheel hub and provided with clutch teeth for engagement with the clutch teeth on said worm gear, a worm for rotating said gear, a power plant carried by said frame, a mowing implement carried by said frame, a constant driving connection between said power plant, mowing implement and worm, and means for shifting the clutch teeth on the collar into engagement with the clutch teeth on the gear to cause the ground wheel to be driven from the power plant.

3. A mowing machine having a frame provided with handle bars, a stationary shaft carried by said frame, a ground wheel having a hub rotatably mounted on said shaft, a worm gear rotatably mounted on said shaft and having clutch teeth, a collar splined on said wheel hub and provided with clutch teeth for engagement with the clutch teeth on said worm gear, a worm for rotating said gear, a power plant carried by said frame, a constant driving connection between said power plant, mowing implement and worm, and means for shifting the clutch teeth on the collar into engagement with the clutch teeth on the gear to cause the ground wheel to be driven from the power plant, including a rock shaft having a crank engaging a groove in said collar, a rock arm connected to said rock shaft and provided adjacent one of the handle bars with a rockable operating lever.

ROBERT W. WAGNER.